A. WELIN.

APPARATUS FOR RAISING AND LOWERING SHIPS' BOATS.

APPLICATION FILED DEC. 2, 1907.

Reissued June 22, 1909.

12,979.

3 SHEETS—SHEET 1.

WITNESSES

Julius Schulz

Edwin Crane.

INVENTOR.

Axel Welin

BY

R. H. E. Starr

ATTORNEY

A. WELIN.

APPARATUS FOR RAISING AND LOWERING SHIPS' BOATS.

APPLICATION FILED DEC. 2, 1907.

Reissued June 22, 1909.

12,979.

3 SHEETS—SHEET 2.

WITNESSES

Julius Ahrens

Edwin Crane

INVENTOR:

Axel Welin,

BY

R. H. E. Starr,

ATTORNEY.

A. WELIN.

APPARATUS FOR RAISING AND LOWERING SHIPS' BOATS.

APPLICATION FILED DEC. 2, 1907.

Reissued June 22, 1909.

12,979.

3 SHEETS—SHEET 3.

WITNESSES

Julius H. Kurz

Edwin Crane

INVENTOR.

Axel Welin,

BY

A. H. E. Starr,

ATTORNEY.

UNITED STATES PATENT OFFICE.

AXEL WELIN, OF LONDON, ENGLAND, ASSIGNOR TO WELIN QUADRANT DAVIT, OF NEW YORK, N. Y., A CORPORATION OF NEW YORK.

APPARATUS FOR RAISING AND LOWERING SHIPS' BOATS.

No. 12,979. Specification of Reissued Letters Patent. Reissued June 22, 1909.

Original No. 680,823, dated August 20, 1901, Serial No. 62,103. Application for reissue filed December 2, 1907. Serial No. 404,864.

*To all whom it may concern:*

Be it known that I, AXEL WELIN, engineer, a subject of the King of Sweden and Norway, residing at Garford street, in the city of London, England, have invented certain new and useful Improvements in Apparatus for Raising and Lowering Ships' Boats, of which the following is a specification.

According to this invention the davit turns about a center moving along guides, and its lower end is in the form of a toothed quadrant, preferably circular, rolling on a rack. The weight of the boat and its contents tends to make the quadrants roll on the racks, inclining the davits more and more and at the same time moving them forward. Each davit carries a pawl engaging with a rack in order to prevent the davits from being brought back by the rolling of the ship, or the motion of the davit may be controlled by a screw or other means. If the davits are curved and inboard of the boat, they need not be at the ends of the boat.

Figure 1:
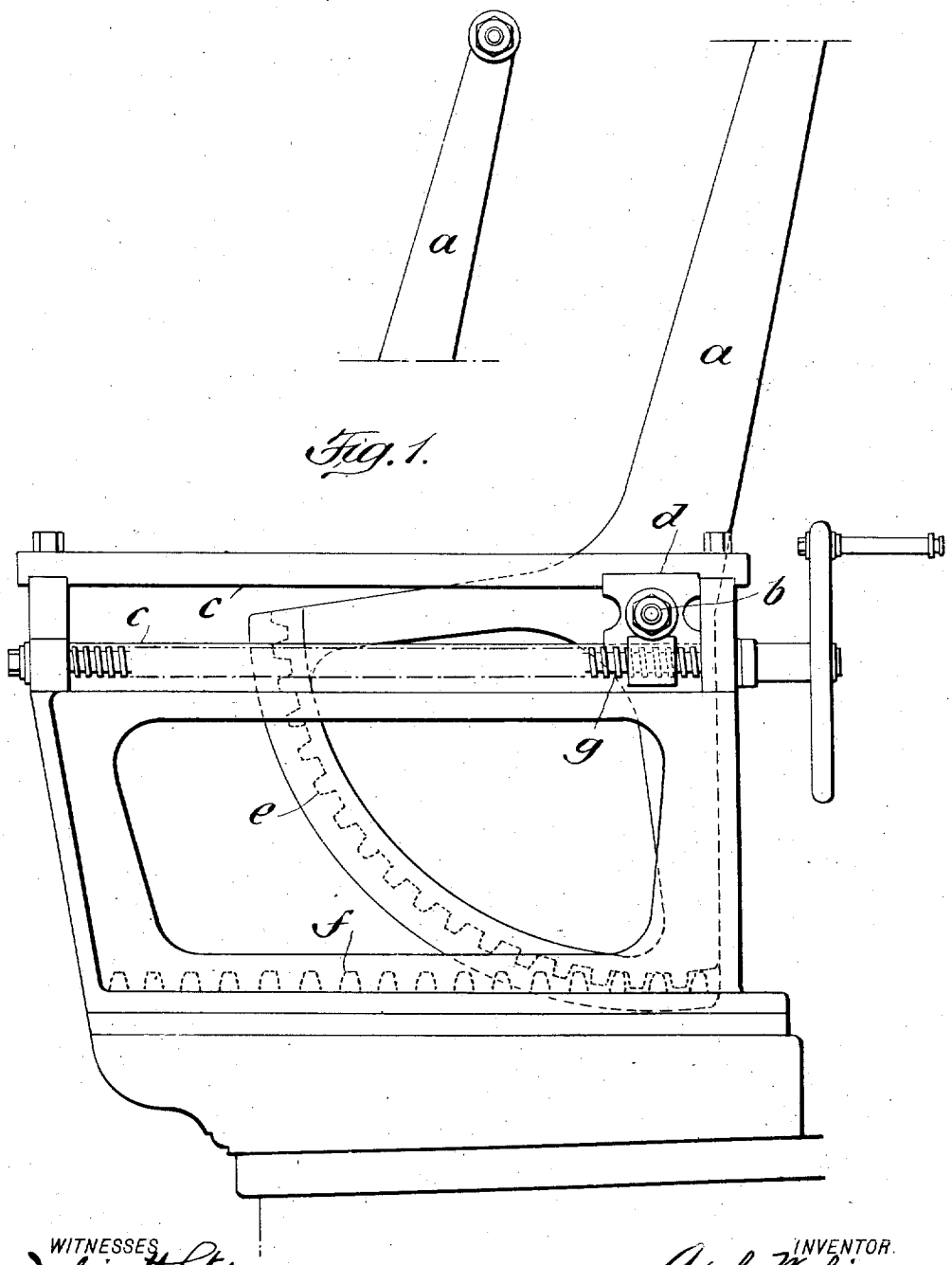
Figure 2:
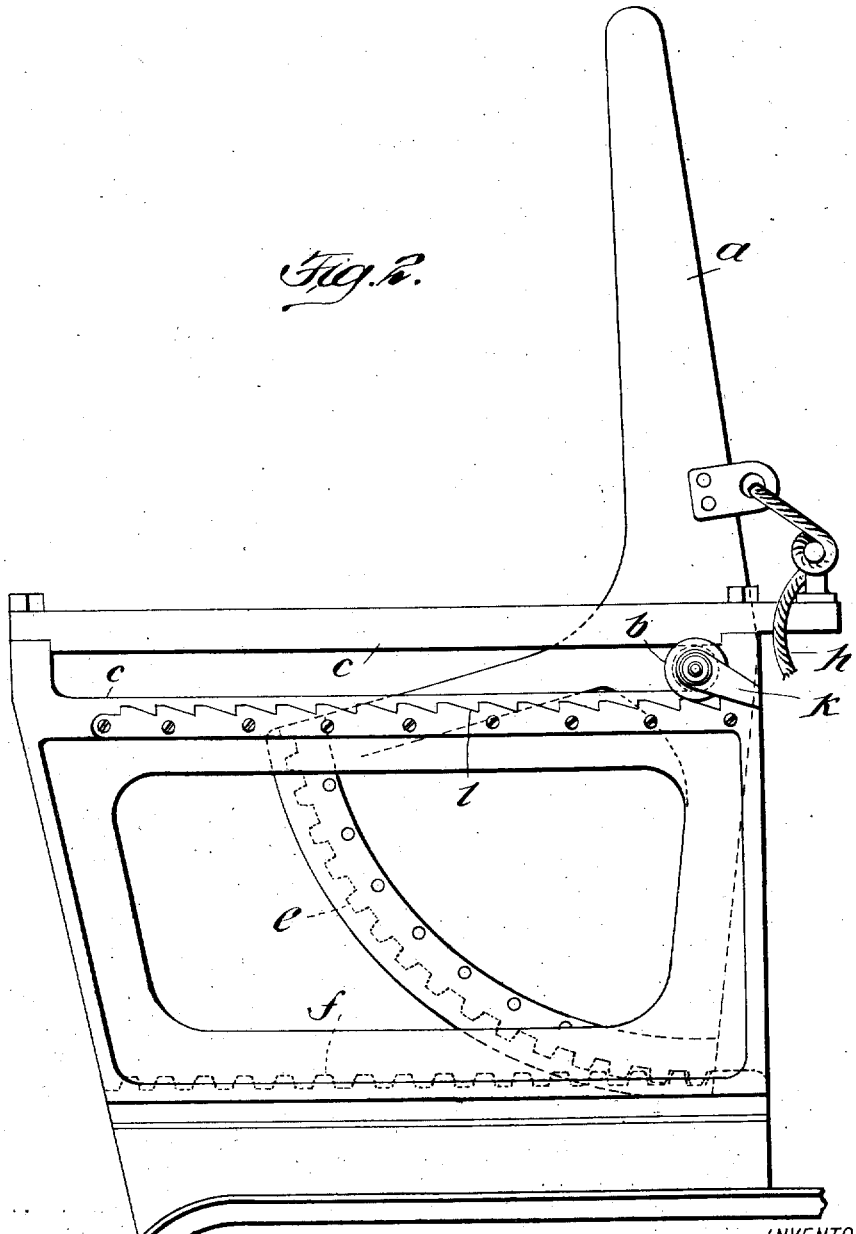
Figure 3:
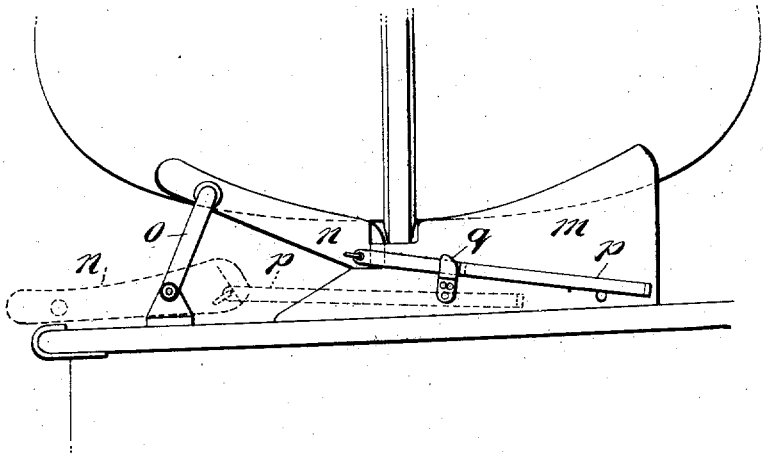
Figure 4:
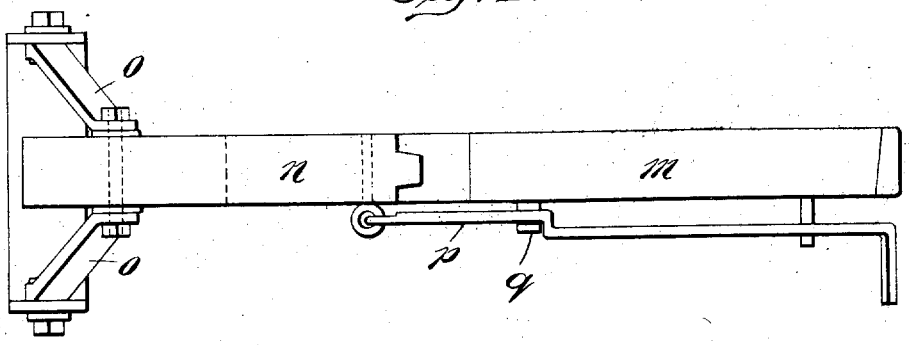

Figures 1 and 2 are side elevations of davits constructed according to this invention. Fig. 3 is an elevation and Fig. 4 a plan of the chocks employed.

*a* is the davit, carrying a pin *b*, running between guides *c*.

In Fig. 1 the pin *b* works in a block *d*, sliding between the guides, while in Fig. 2 the pin *b* is in the form of a roller running between the guides.

*e* is a toothed quadrant forming the lower part of the davit, and *f* is a rack on which it rolls.

In Fig. 1 the motion is controlled by the screw working in a nut formed by a lug on the block *d*, while in Fig. 2 the outward motion is controlled by the rope *h*, and the davit is prevented from being swung back by the rolling of the ship by the pawl *k*, which gears with the rack 1.

The chock *m* is fixed and supports one end of the chock *n*, whose other end is supported by the link *o*. The chock *n* is secured in position by the lever-catch *p*. To lower the boat the lever-catch *p* is raised out of the hook *q*, and then as the boat moves outward it pushes the chock *n* with it into the position shown in dotted lines in Fig. 3.

In cases where the apparatus may be in danger of getting covered by ice a hole is bored lengthwise through the body of the rack and connected with a steam-pipe. By this means the ice is melted and the gear kept in working order.

What I claim is:—

1. The combination of a davit, a pivot about which the davit can turn, guides for the pivot, a toothed segment at the lower end of the davit, and a rack on which the segment can roll.

2. The combination of a davit, a pivot about which the davit can turn, guides for the pivot, means for controlling the movement of the pivot in the guides, a toothed segment at the lower end of the davit, and a rack on which the segment can roll.

3. The combination of a davit, a pivot about which the davit can turn, a block carrying the pivot, guides for the block, a nut fixed to the block, a screw working in the nut, a toothed segment at the lower end of the davit, and a rack on which the segment can roll.

4. The combination of a davit, means for moving the top of the davit outward, a stationary chock, a second chock supported at one end by the first, and links supporting the other end of the second chock.

5. The combination of a davit, a pivot about which the davit can turn, guides for the pivot, a toothed segment at the lower end of the davit, a rack on which the segment can roll, a stationary chock, a second chock, supported at one end by the first, and links supporting the other end of the second chock.

6. The combination of a davit, a pivot about which the davit can turn, guides for the pivot, means for controlling the movement of the pivot in the guides, a toothed segment at the lower end of the davit, a rack on which the segment can roll, a stationary chock, a second chock supported at one end by the first, and links supporting the other end of the second chock.

7. The combination of a davit, a pivot about which the davit can turn, a block carrying the pivot, guides for the block, a nut fixed to the block, a screw working in the nut, a toothed segment at the lower end of the davit, a rack on which the segment can roll, a stationary chock, a second chock supported at one end by the first, and links supporting the other end of the second chock.

8. The combination of a davit turning about a center and provided with a lower portion having a curved lower surface, a base on which said curved surface rolls, means for preventing said curved surface from slipping on said base and guides to prevent undesirable sidewise movement of the davit.

In testimony whereof, I have hereunto set my hand in the presence of two subscribing witnesses.

AXEL WELIN.

Witnesses:
GEORGE H. SCHRODER,
JOS. F. O'BRIEN.